United States Patent [19]
Moore

[11] Patent Number: 6,008,876
[45] Date of Patent: Dec. 28, 1999

[54] POLISHED SELF-ALIGNED PIXEL FOR A LIQUID CRYSTAL SILICON LIGHT VALVE

[75] Inventor: Paul McKay Moore, San Bruno, Calif.

[73] Assignee: National Semiconductor Corporation, Santa Clara, Calif.

[21] Appl. No.: 09/204,825

[22] Filed: Dec. 3, 1998

[51] Int. Cl.[6] ............... G02F 1/1343; G02F 1/1339; G03C 5/00
[52] U.S. Cl. ............ 349/139; 349/156; 430/311; 430/319
[58] Field of Search .................. 349/139, 114, 349/122, 143, 155, 156; 430/311, 317, 319, 314

[56] References Cited

U.S. PATENT DOCUMENTS

| | | |
|---|---|---|
| 5,076,670 | 12/1991 | Sayyah ..................... 349/138 |
| 5,244,534 | 9/1993 | Yu et al. ..................... 438/672 |
| 5,497,255 | 3/1996 | Yamazaki et al. .............. 349/114 |
| 5,706,067 | 1/1998 | Colgan et al. ................ 349/114 |
| 5,708,486 | 1/1998 | Miyawaki et al. .............. 349/111 |
| 5,764,324 | 6/1998 | Lu et al. ..................... 349/113 |

*Primary Examiner*—William L. Sikes
*Assistant Examiner*—Dung Nguyen
*Attorney, Agent, or Firm*—Limbach & Limbach, L.L.P.

[57] ABSTRACT

An array of pixels in a liquid crystal silicon light valve are fabricated with a minimum of surface topology by forming raised dielectric spacer walls on an underlying array support surface prior to the deposition of the metal pixel electrode layer. Deposition of the metal pixel electrode layer, followed by chemical-mechanical polishing to stop on the top of the spacer walls, produces an electrode surface that is flush with the tops of the dielectric spacer walls. This resulting planarity in the surface of the pixel cell array minimizes surface topology exhibited by the array, maximizing reflectance of the light valve.

17 Claims, 16 Drawing Sheets

POLISHED SELF-ALIGNED PIXEL FOR A LIQUID CRYSTAL SILICON LIGHT VALVE

BACKGROUND OF THE INVENTION

1. Field of the Invention

The present invention relates to light valves, and in particular, to light valves utilizing self-aligned thin liquid crystal pixel cells having metal electrodes that are electronically isolated from one another by dielectric spacer walls flush with the electrode surface.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye. Two factors dictate the minimum frequency necessary for switching.

The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1A shows a top view of a conventional thin LC transducer pixel cell. FIG. 1B shows a cross-sectional view of the thin liquid crystal transducer along line A–A' of FIG. 1A.

Thin LC transducer pixel cell 100 comprises a layer of liquid crystal (LC) material 102 sandwiched between a top plate 104 and a bottom plate 106. Top plate 104 is a translucent material, typically glass. Bottom plate 106 is a reflective pixel electrode layer.

Pixel electrode layer 106 is delineated into individual pixel electrodes 130 by intervening trenches 118. Pixel electrode layer 106 lies on top of an upper intermetal dielectric layer 112 that is one component of an interconnect scheme. The interconnect overlies a capacitor structure formed within an underlying silicon substrate (not shown). Upper intermetal dielectric layer 112 electrically insulates pixel electrode 130 from lower metallization layer 114. The underlying capacitor structure is in electrical communication with pixel electrode 130 through metal-filled via 116.

FIGS. 2AA–2DB illustrate the conventional process for forming a thin LC transducer pixel cell. For purposes of convention, all FIG. 2_A illustrate a top view of the pixel cell, all FIG. 2_B illustrate a cross-sectional view of the pixel cell along line A–A' of the FIG. 2_A.

FIGS. 2AA–2AB illustrate the starting point for the conventional process for fabricating a thin LC transducer pixel cell. Starting structure 200 is created by forming an upper intermetal dielectric layer 212 over a lower interconnect metallization layer 214. A central portion of upper intermetal dielectric layer 212 is then etched to form via 216. A liner (not shown) typically composed of a Ti/TiN layer combination, is then formed on the walls of via 216, and via 216 is filled with metal (typically CVD Tungsten). Excess metal is then removed from the surface of upper dielectric layer 212, typically by a combination of etching and chemical-mechanical polishing (CMP).

FIGS. 2BA–2BB illustrate formation of the metal pixel electrode in accordance with the conventional process. Metal pixel electrode layer 206 is formed over the entire surface of the pixel cell.

FIGS. 2CA–2CB illustrate patterning of a photoresist mask 207 over pixel electrode layer 206. FIGS. 2DA–2DB show the etching of regions of pixel electrode layer 206 unmasked by photoresist 207, to form a plurality of intersecting trenches 218, followed by stripping of photoresist mask 207. Intersecting trenches 218 in turn define a plurality of discrete pixel cell electrodes 230.

Fabrication of the thin LC transducer pixel cell is completed by forming an alignment surface (not shown) for the LC material positioned on top of the pixel electrode. Forming this alignment surface is a two step process. First, a dielectric film (typically polyimide) is deposited on top of the pixel electrode. Second, the dielectric film is scored by a rubbing wheel, which traverses the surface of the pixel cell and gouges the alignment surface in a uniform direction. Liquid crystal material is then placed within the cell, and a top glass plate is secured to the tops of the support pillars.

The conventional fabrication process described above in FIGS. 2AB–2DB is adequate to produce functional thin LC transducer pixel cells. However, the conventional process flow suffers from a number of serious disadvantages.

One problem with the process described above is that it creates significant pixel surface topology that can result in optical degradation.

Liquid crystal material overlying the pixel electrode has the propensity to align and/or tilt with the grooves caused by any topology present on the surface of the pixel cell. LC alignment is a critical system attribute. The alignment of the twisted nematic LC dictates which polarization of incident light will pass through the LC's volume. In the context of a complete system, this alignment of the LC material defines either the black or white extreme of the light valve's gray scale. As a result, non-uniformity in alignment due to the presence of surface topology will translate into a poorly constructed display.

In FIGS. 1A–1B, the pixel array includes a plurality of discrete pixel electrodes that are electronically isolated from one another by a series of intersecting trenches having side walls and a trench bottom. These surface topology features can interact with the overlying LC material, causing it to misalign. This misalignment can cause unwanted distortion of the image formed using the light valve.

In addition, surface topology of the pixel cell can also interact directly with incident light, causing reflection that is not harmonious with that of the main body of the pixel electrode. The interaction of light with the pixel topography is due to the isolation edges of the pixel. For example, in the pixel array shown in FIGS. 1A–1B light will scatter from the sidewalls and bottom of the trenches present at the pixel edges. This unwanted scattering reduces the specular reflection of the pixel, and increases optical cross-talk between pixels.

Therefore, there is a need in the art for a process of forming a thin LC transducer pixel cell that creates a minimum of surface topology on the pixel cell surface while maintaining electrical isolation between pixel electrodes.

A second problem associated with the conventional method of fabricating light valves is etching of the metal pixel electrode layer to form discrete pixel electrodes. This etch step degrades the reflectance of the pixel electrode. When the metal pixel electrode layer is freshly deposited, it is extremely smooth and exhibits high reflectance desirable for optimum performance. However, etching the metal pixel electrode layer to form the trenches isolating individual pixel electrodes can roughen and/or oxidize the surface of the pixel electrode layer, lowering its reflectance.

Therefore, there is a need in the art for a process of forming a thin LC transducer pixel cell that avoids etching or otherwise roughening the surface of the pixel electrode.

SUMMARY OF THE INVENTION

The present invention relates to an array of liquid crystal pixel cells, and to a process for fabricating an array of liquid crystal pixel cells, that creates a minimum surface topology and which includes dielectric spacer walls flush with the surface of the pixel electrodes that electronically isolate the individual pixel cells of the array.

The process flow for forming the pixel cell in accordance with the present invention calls for the formation of an underlying array support structure featuring a plurality of raised, intersecting spacer walls prior to deposition of the metal pixel electrode layer. The presence of the spacer walls eliminates the need to subsequently etch the metal electrode layer to form trenches isolating the discrete pixel electrodes.

Specifically, a process of forming an array of thin liquid crystal transducer pixel cells in accordance with one embodiment of the present invention includes the steps of forming an array support structure from a dielectric material featuring a plurality of raised and intersecting spacer walls having a top surface, forming a pixel electrode liner layer over the array support structure, forming a metal pixel electrode layer on top of the pixel electrode liner layer, and chemical-mechanical polishing the metal pixel electrode layer to expose the top surface of the spacer walls such that a plurality of metal pixel electrodes are formed.

A pixel cell array for a silicon light valve in accordance with the present invention comprises a plurality of reflective metal electrodes formed over a dielectric layer, the plurality of reflective metal electrodes electronically isolated from one another by a plurality of raised dielectric spacer walls that are also formed over the dielectric layer.

The features and advantages of the present invention will be understood upon consideration of the following detailed description of the invention and the accompanying drawings.

DETAILED DESCRIPTION

During fabrication of a thin LC transducer pixel cell in accordance with the present invention, self-aligned dielectric spacer walls are formed on top of the highest intermetal dielectric prior to formation of the metal pixel electrode layer. Subsequent formation and polishing of the pixel electrode layer creates a self-aligned structure having the surface of the electrodes flush with the tops of the dielectric spacer walls. This configuration of pixel cells exhibits a minimum of surface topology and maximum reflectance. Moreover, this process flow obviates the need for etching the freshly deposited pixel electrode layer to electronically isolate the discrete pixel electrodes.

Figure 1A:
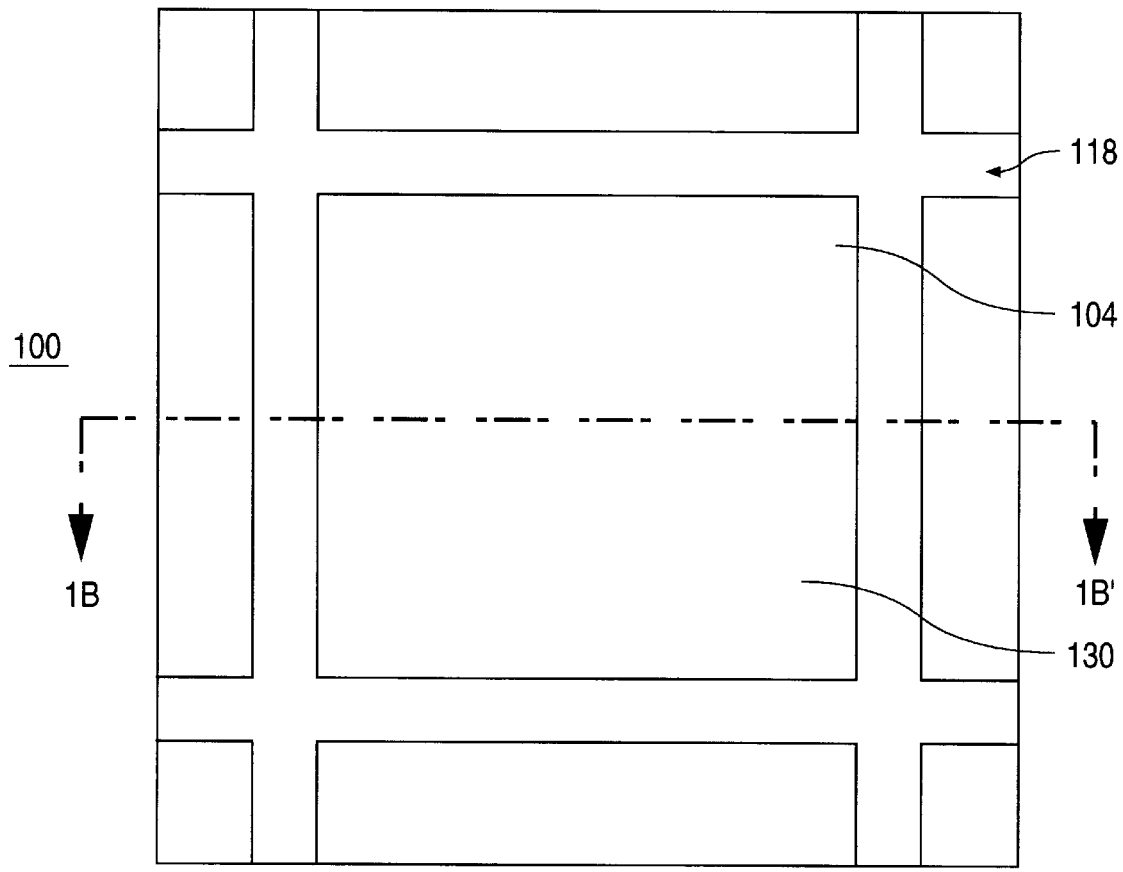
FIG. 1A shows a top view of a conventional thin LC transducer pixel cell.
Figure 1B:
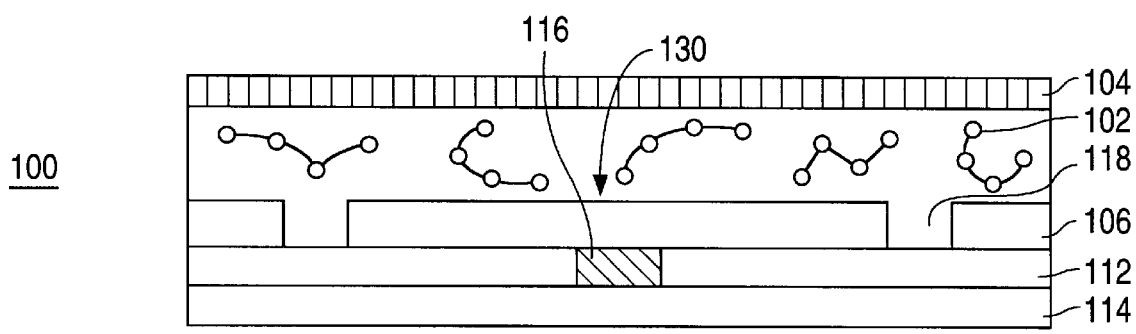
FIG. 1B shows a cross-sectional view of the thin LC transducer pixel cell along line A–A' of FIG. 1A.
Figure 2A:
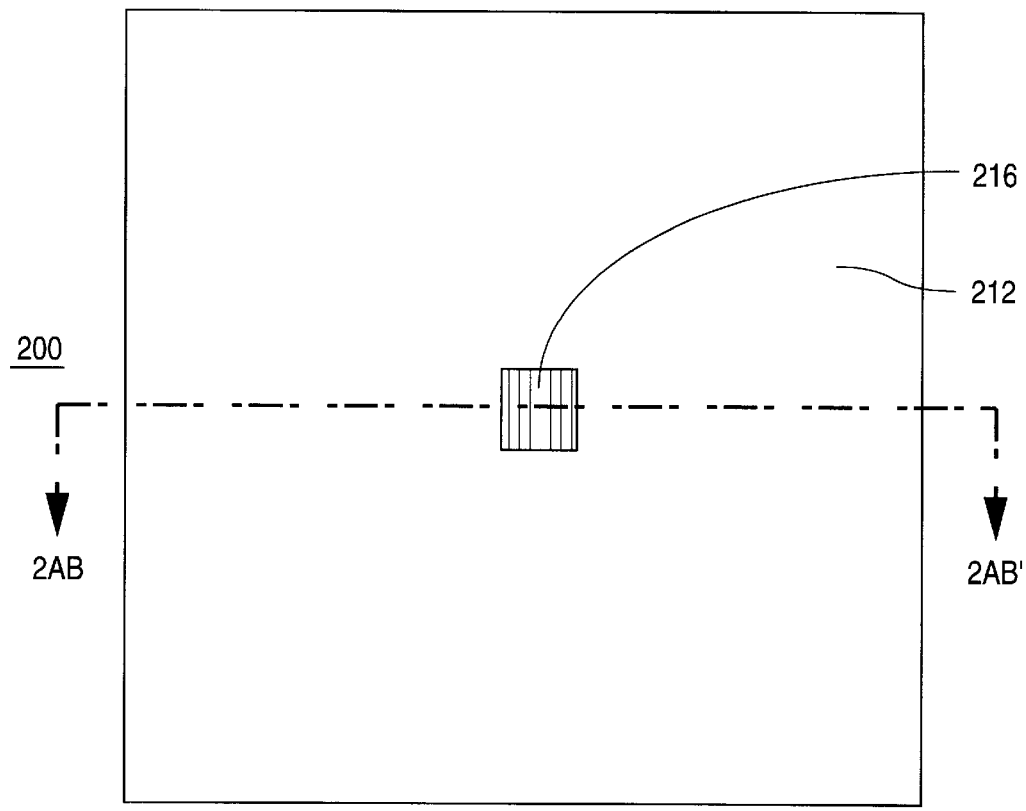
FIGS. 2AA–2DB show top and cross-sectional views of conventional process steps for forming a thin LC transducer pixel cell.
Figure 2A:
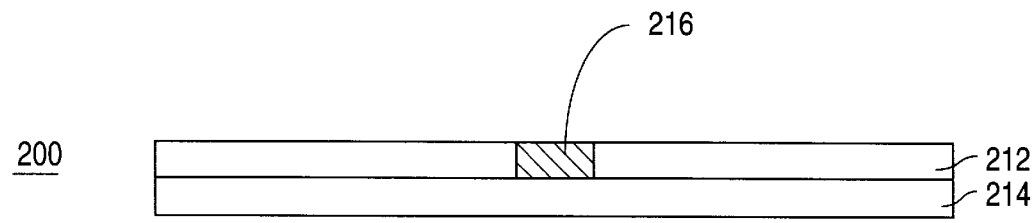
Figure 2B:
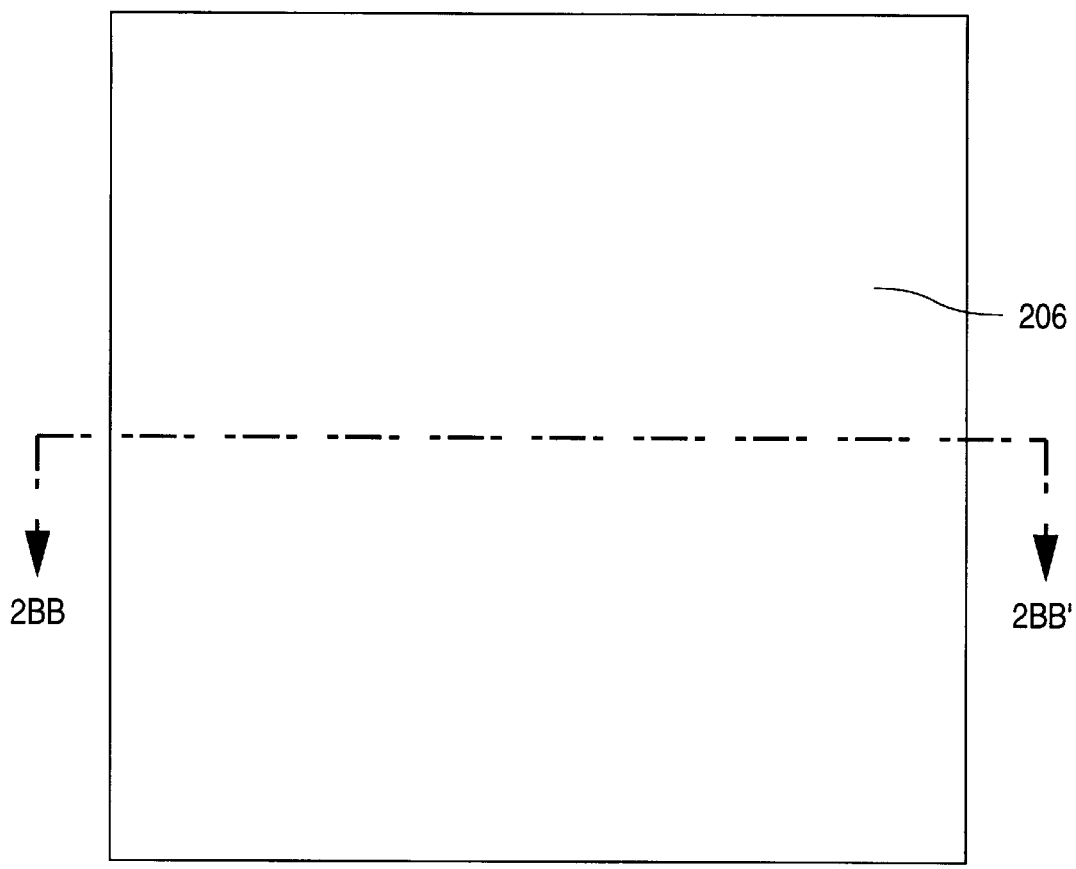
Figure 2B:
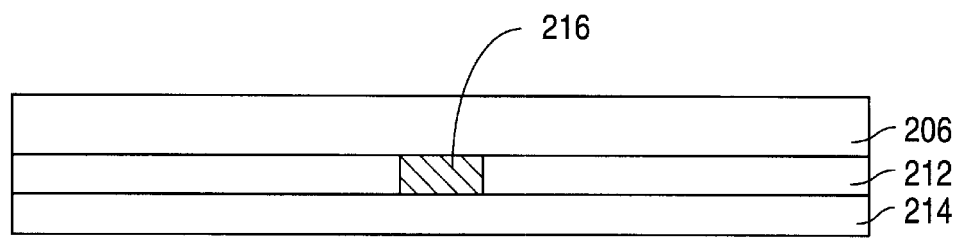
Figure 2C:
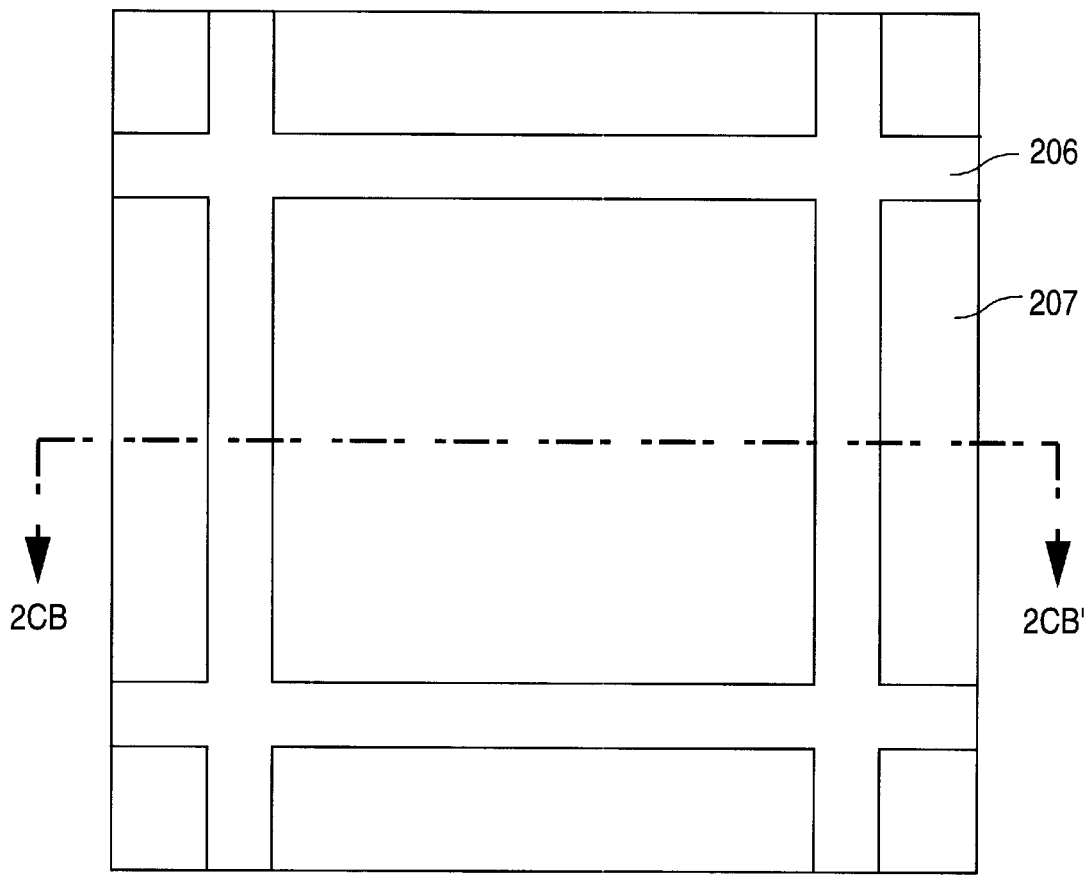
Figure 2C:
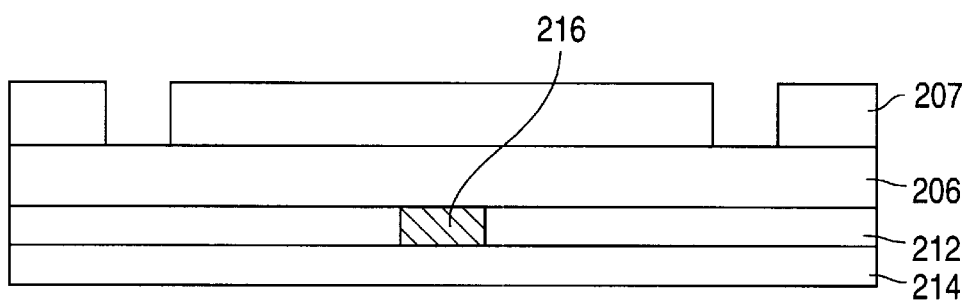
Figure 2D:
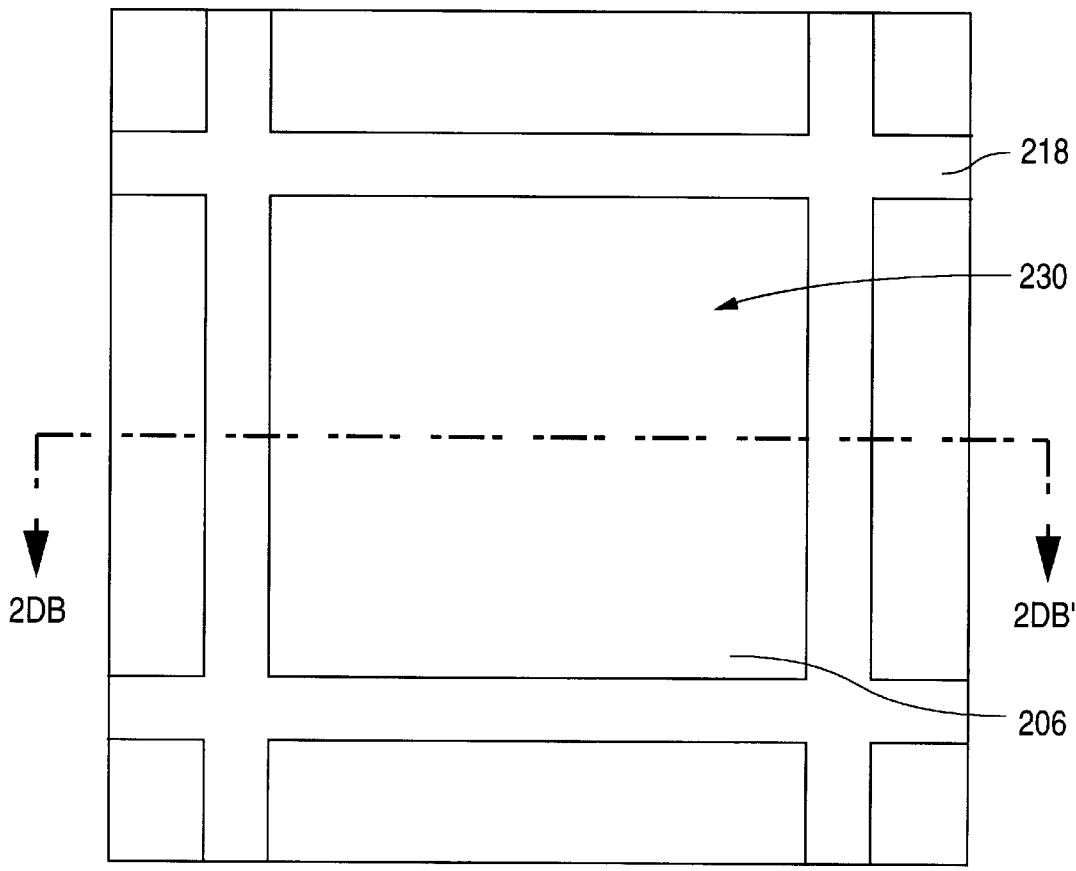
Figure 2D:
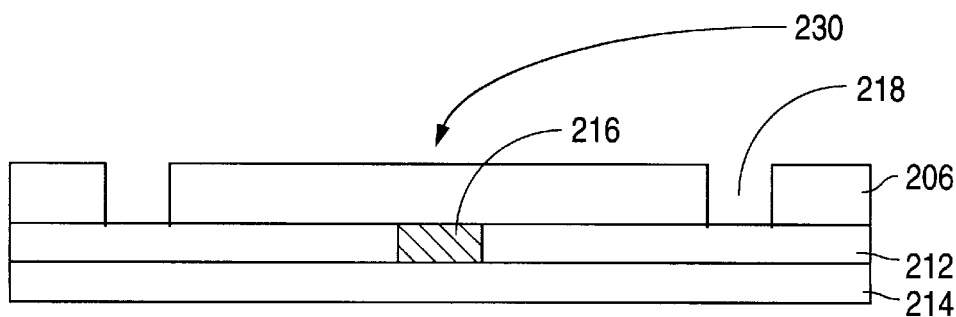
Figure 3A:
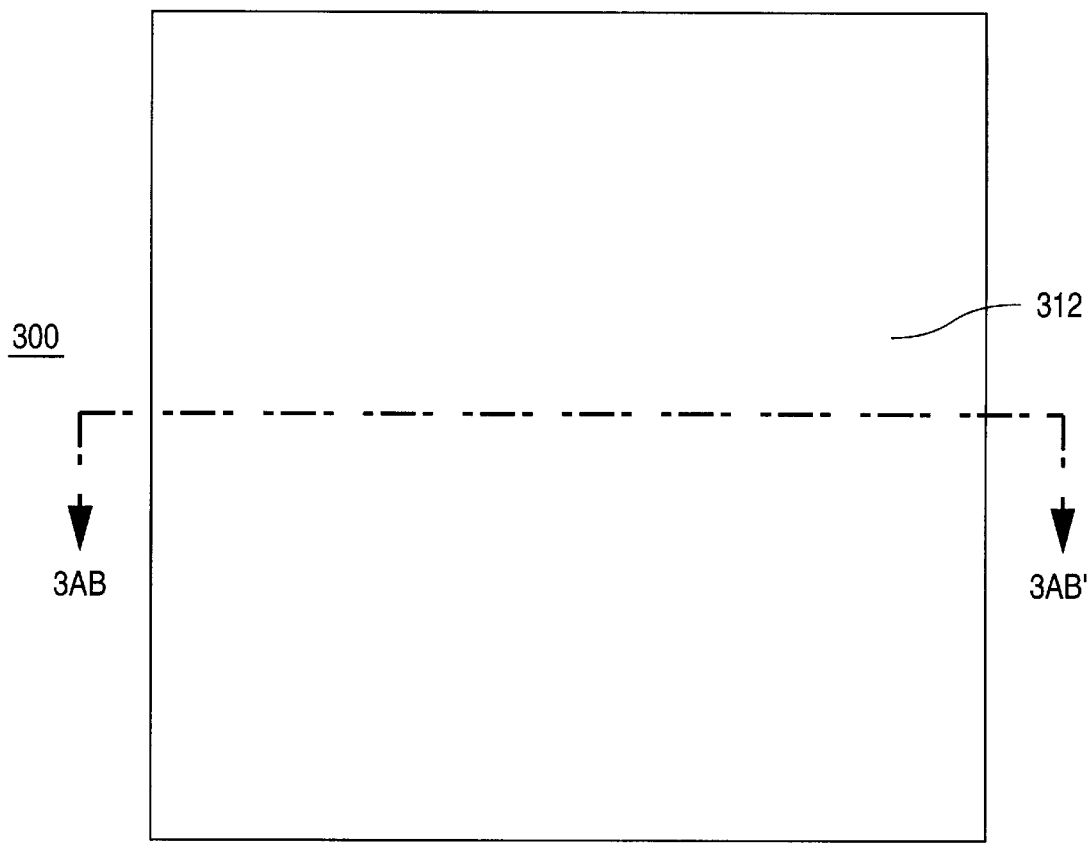
FIGS. 3AA–3JB show top and cross-sectional views of the process steps for forming a thin LC transducer pixel cell in accordance with a first embodiment of the present invention.
Figure 3A:
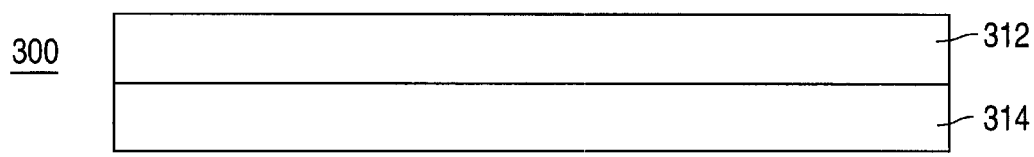

FIGS. 3AA–3JB illustrate the process for forming a thin LC transducer pixel cell in accordance with a first embodiment of the present invention. For purposes of convention, all FIG. 3_A illustrate a top view of the pixel cell, and all FIG. 3_B illustrate a cross-sectional view of the pixel cell along line A–A' of the FIG. 3_A.

FIGS. 3AA–3AB illustrate the starting point for the process of forming the thin LC transducer pixel cell. Starting structure 300 is created by forming an upper intermetal dielectric layer 312 over a lower interconnect metallization layer 314.

Figure 3B:
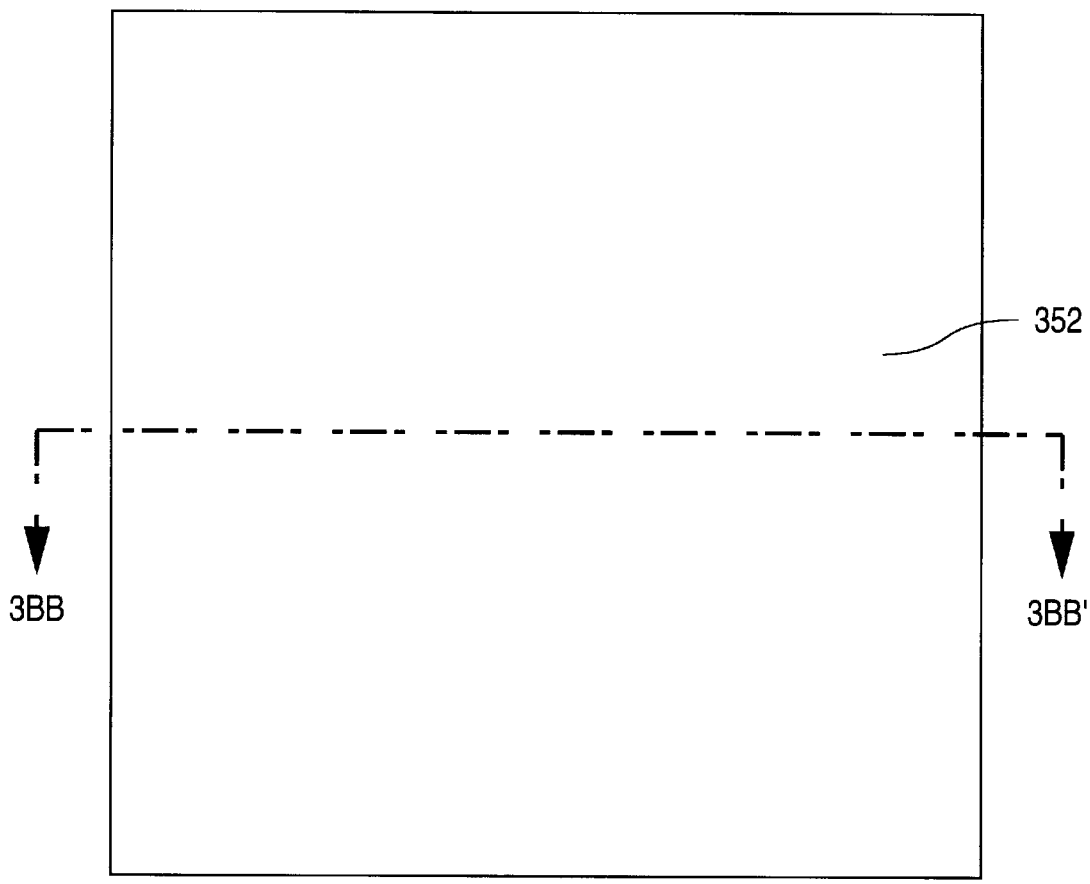
Figure 3B:
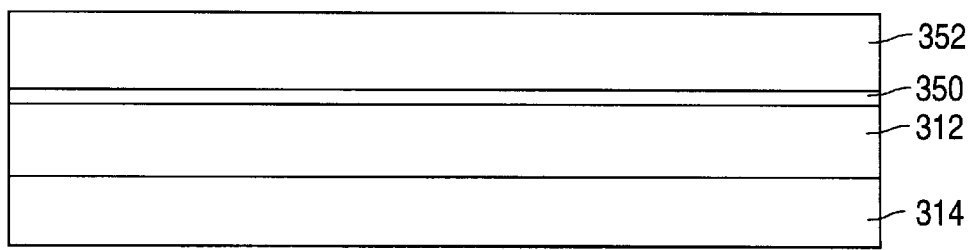

FIGS. 3BA–3BB show the formation of a nitride layer 350 on top of upper intermetal dielectric layer 312. Nitride layer 350 will later eventually serve as an etch-stop for formation of the dielectric spacer walls electronically isolating the individual pixel cells. FIGS. 3BA–3BB also show formation of a spacer wall dielectric layer 352 formed from silicon dioxide on top of etch-stop nitride layer 350. The spacer walls isolating the pixel electrodes will be formed from spacer wall dielectric layer 352.

Figure 3C:
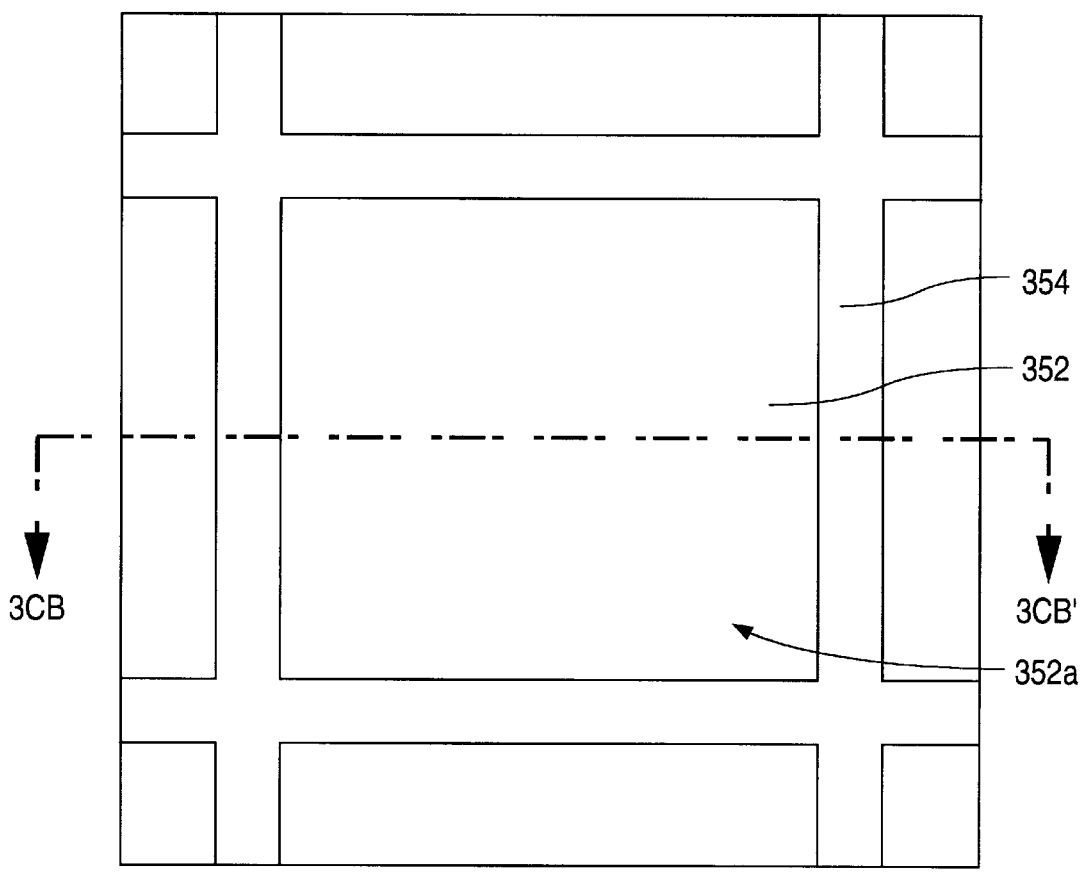
Figure 3C:
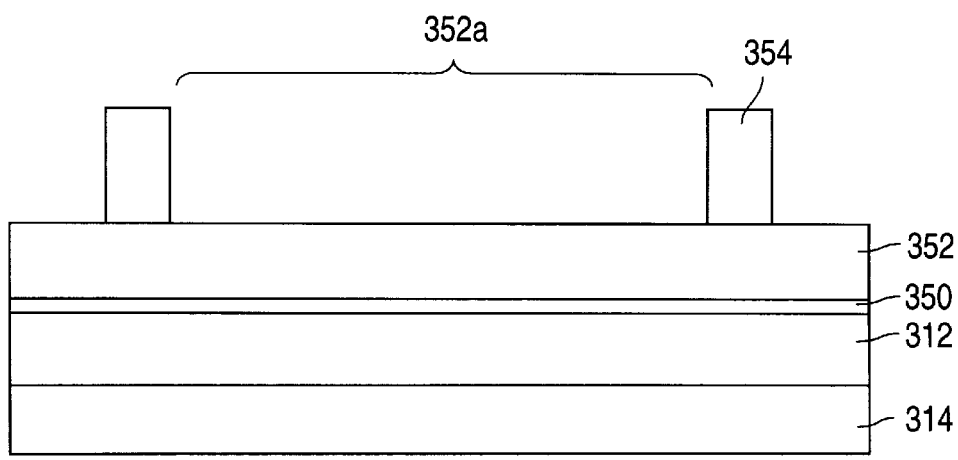

FIGS. 3CA–3CB show patterning of a spacer wall photoresist mask 354 over spacer wall dielectric layer 352. Portions of dielectric layer 352 unmasked by photoresist 354 correspond to precursor pixel regions 352a.

Figure 3D:
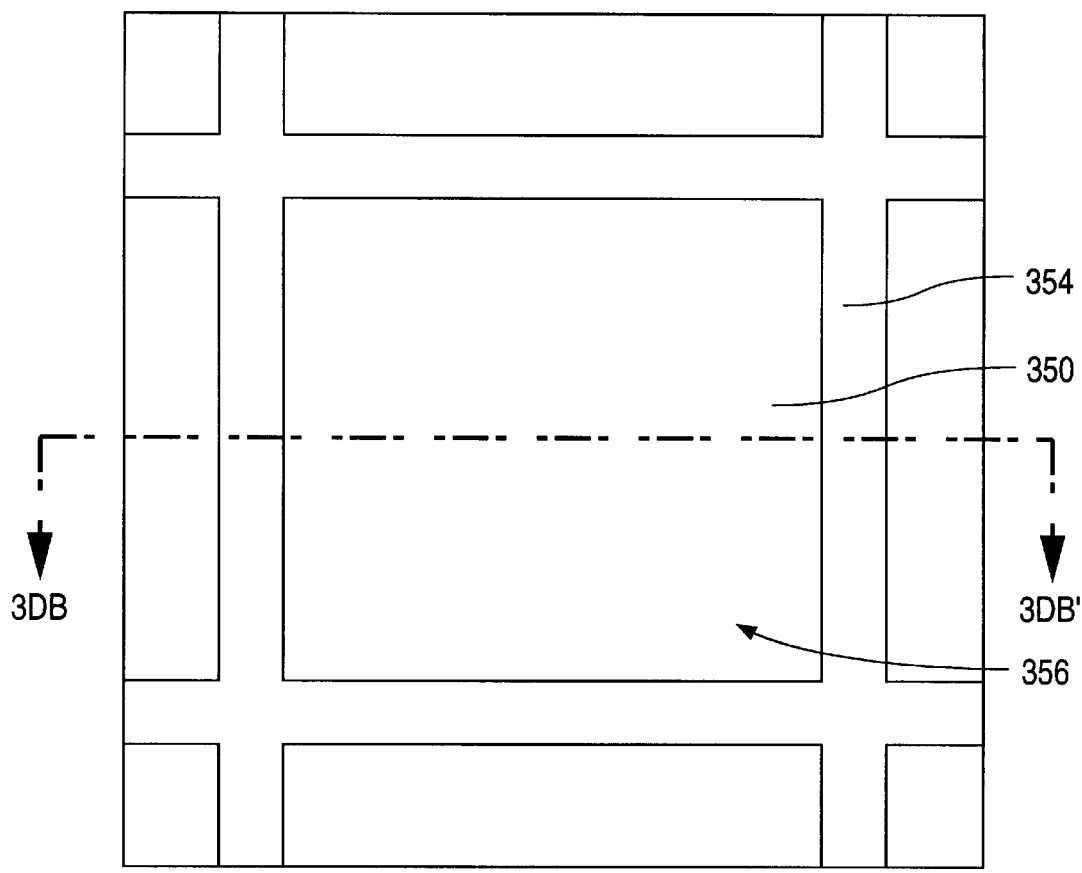
Figure 3D:
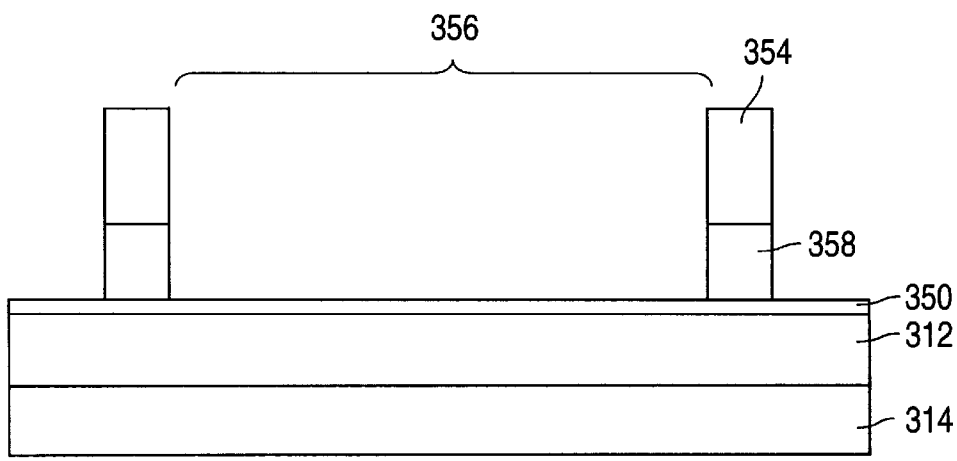

FIGS. 3DA–3DB show etching of the unmasked precursor regions to form pixel regions 356 separated by spacer walls 358 formed from spacer wall dielectric layer 352. Nitride layer 350 serves as an etch-stop, such that upper intermetal dielectric layer 312 is not affected by etching during this step.

Figure 3E:
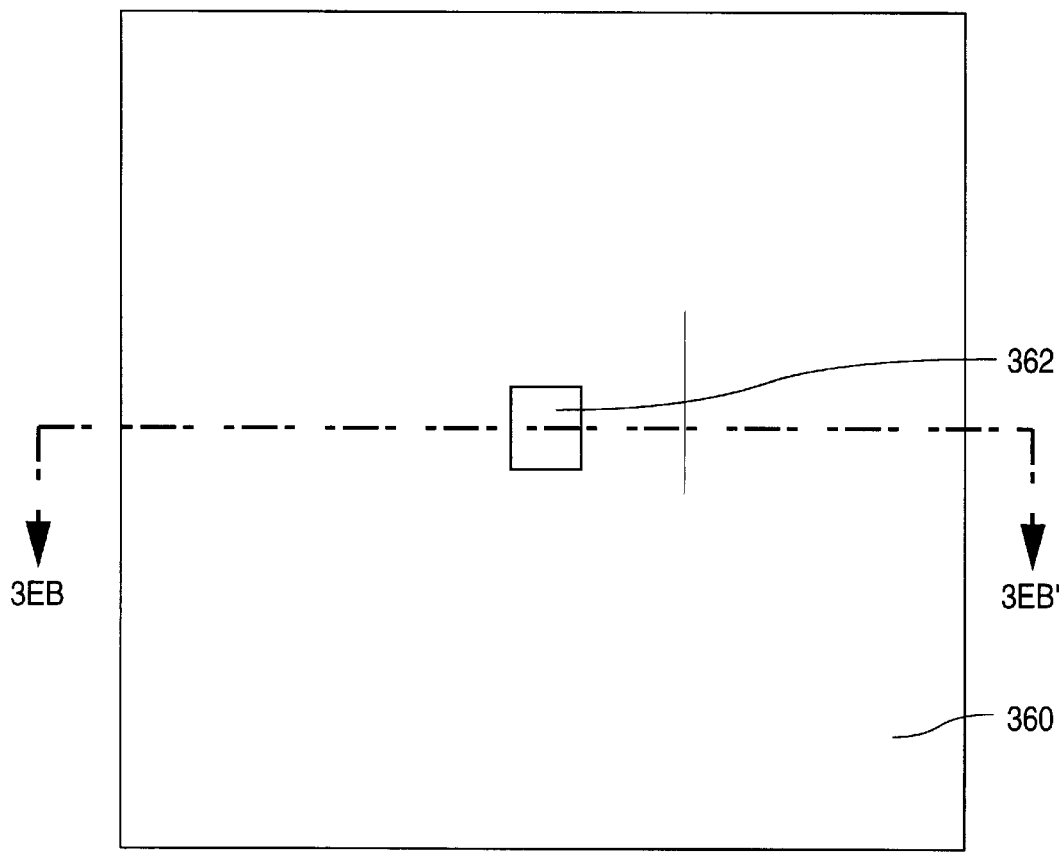
Figure 3E:
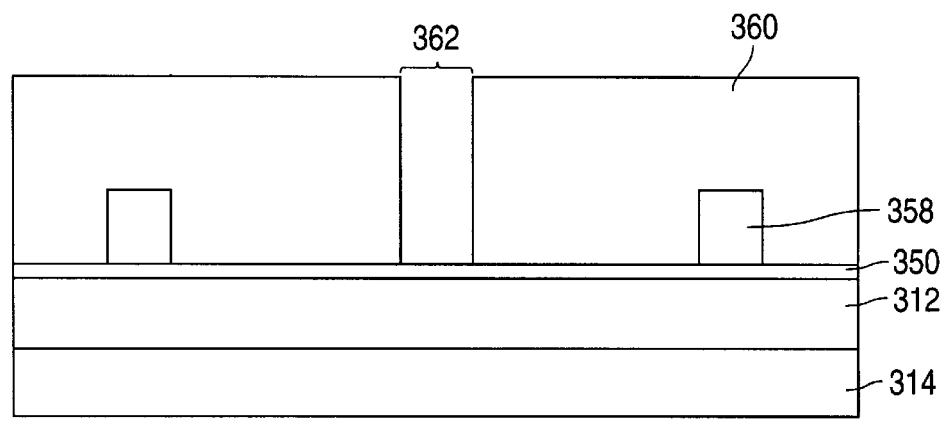

FIGS. 3EA–3EB show removal of spacer wall photoresist mask 354, followed by the formation of via photoresist mask 360. Via photoresist mask 360 excludes only precursor via region 362 positioned at the center of the pixel region 356.

Figure 3F:
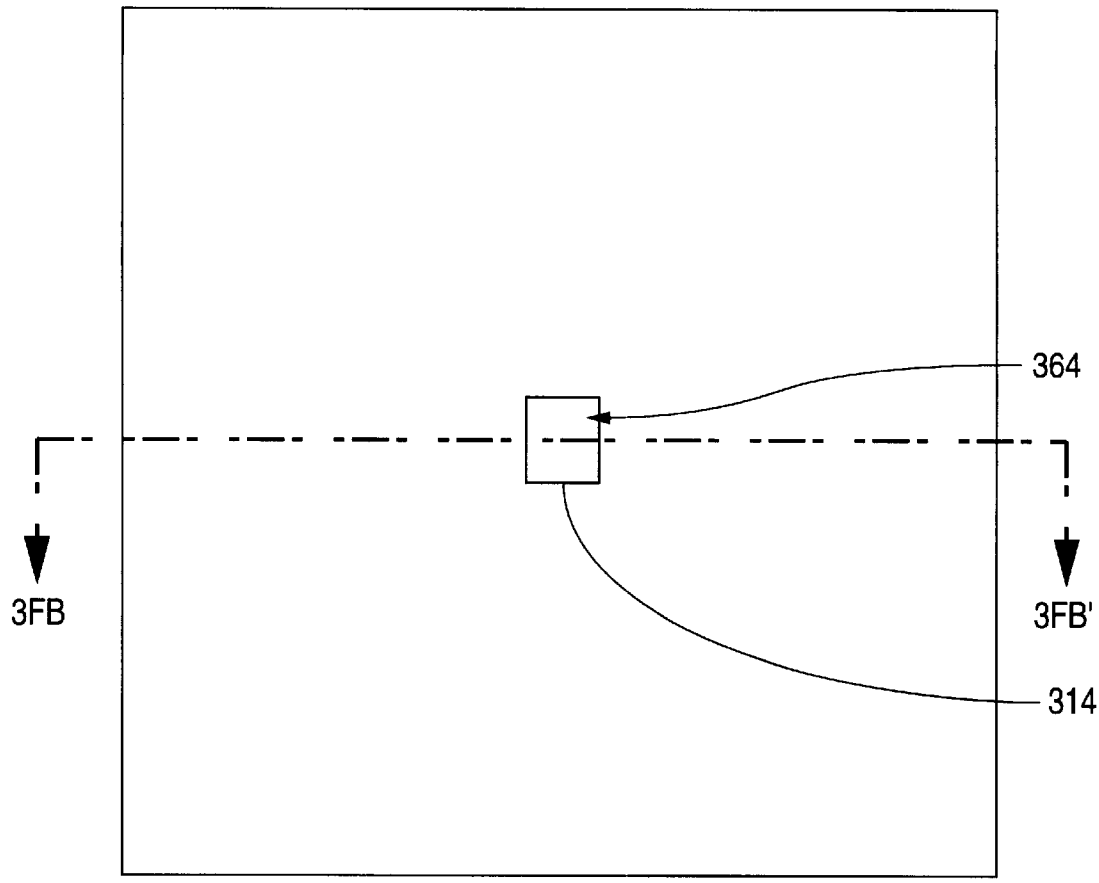
Figure 3F:
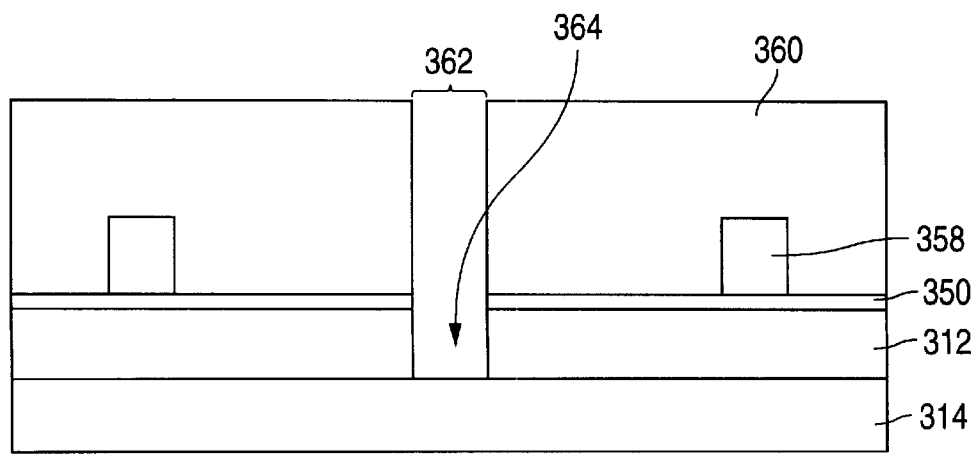
Figure 3G:
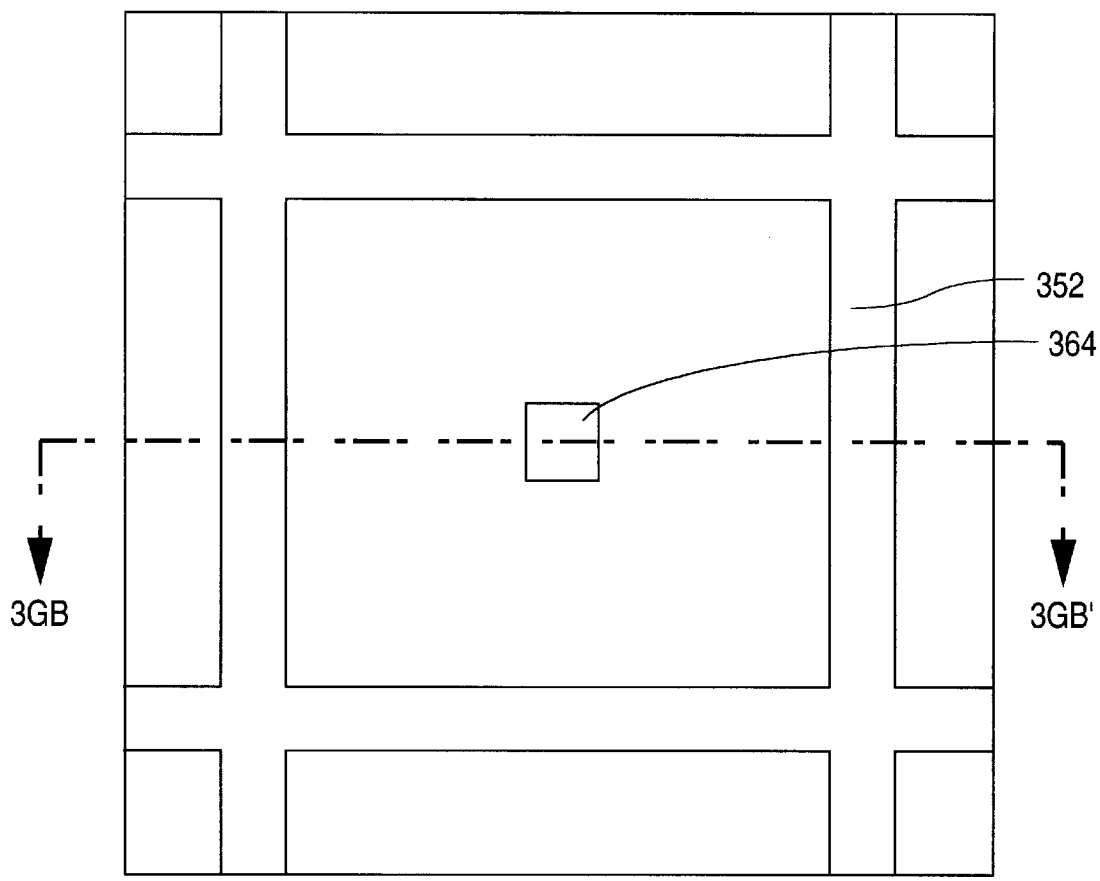
Figure 3G:
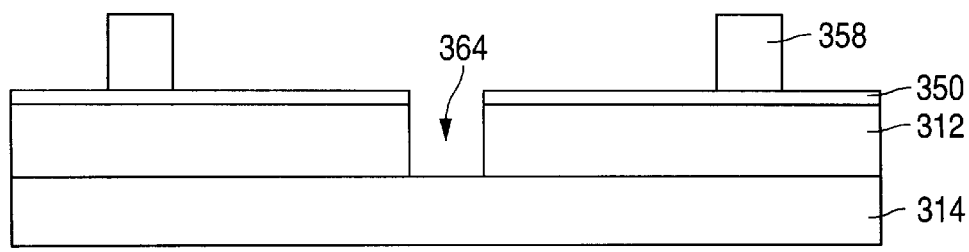

FIGS. 3FA–3FB show etching of precursor via region 362 to form via 364. FIGS. 3GA–3GB show removal of via photoresist mask 360, revealing spacer walls 358.

Figure 3H:
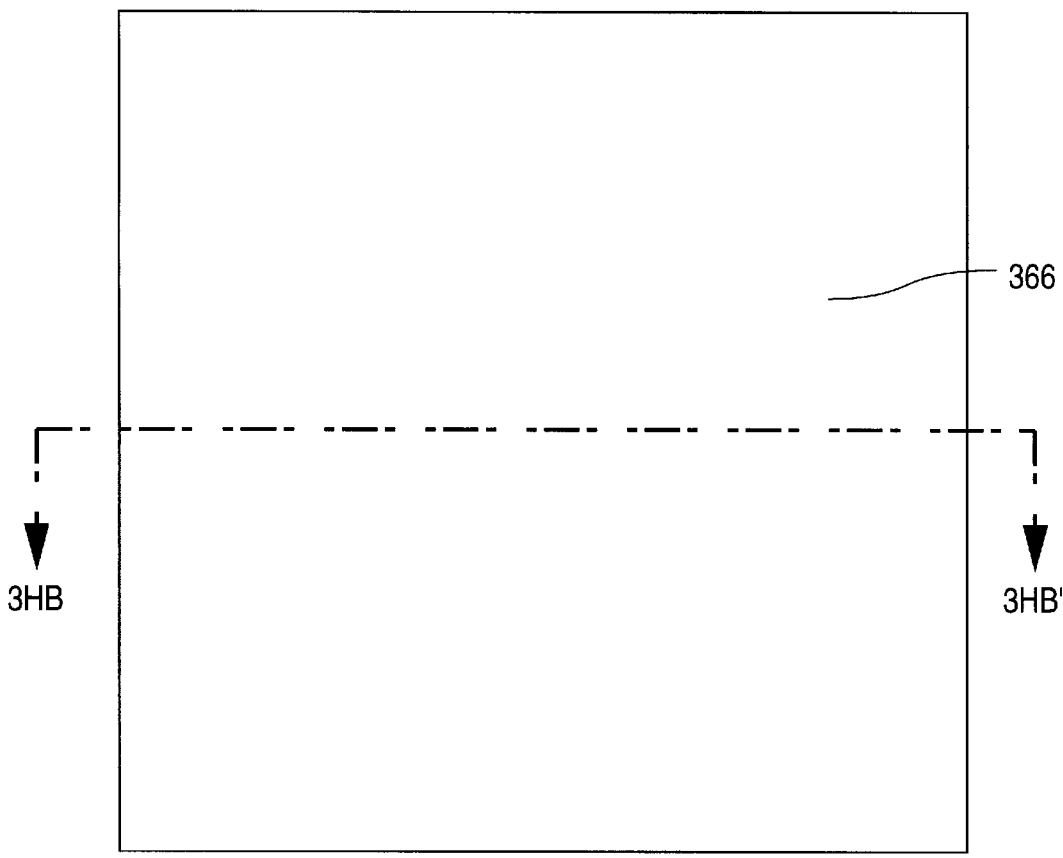
Figure 3H:
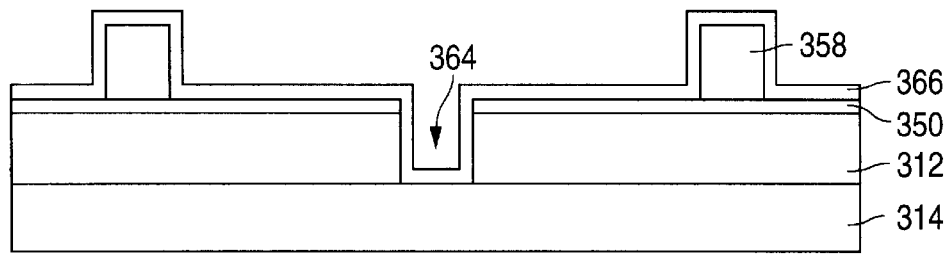

FIGS. 3HA–3HB show the formation of a pixel electrode liner layer 366 (typically Ti/TiN) over the entire surface of the array support structure 367, including etch stop layer 350 and the tops of spacer walls 358.

Figure 3I:
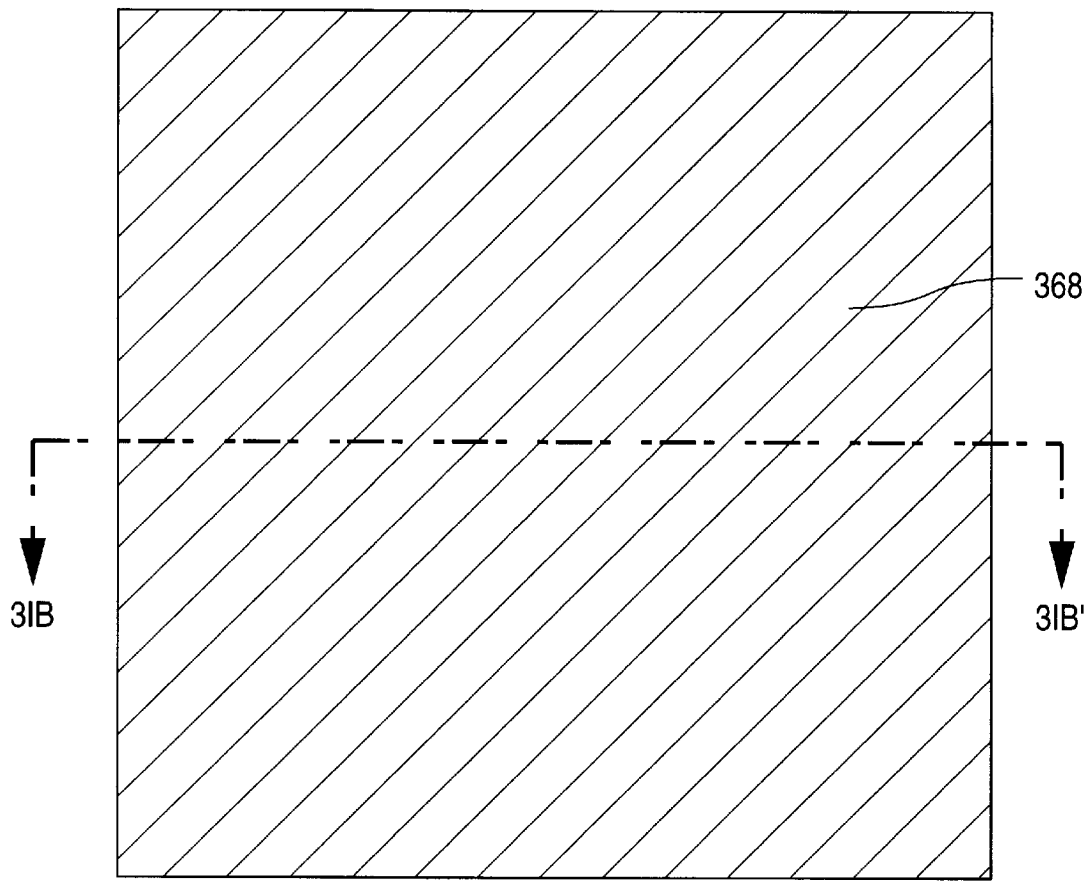
Figure 3I:
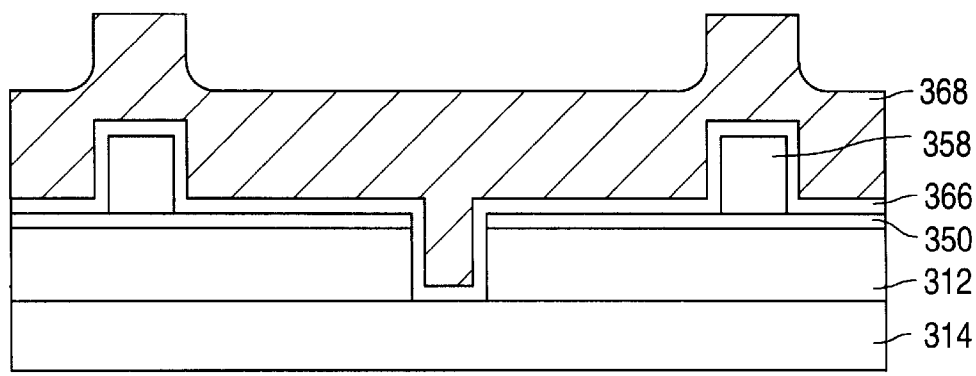

FIGS. 3IA–3IB show deposition of metal pixel electrode layer 368 over pixel electrode liner layer 366. Metal pixel electrode layer 368 may have a thickness of anywhere between about 500 Å and 2000 Å. As discussed below in connection with FIGS. 4A–4B, the thickness of metal pixel electrode layer 368 must be optimized relative to the height of the spacer walls to ensure the ultimate planarity of the surface of the pixel cell.

Figure 3J:
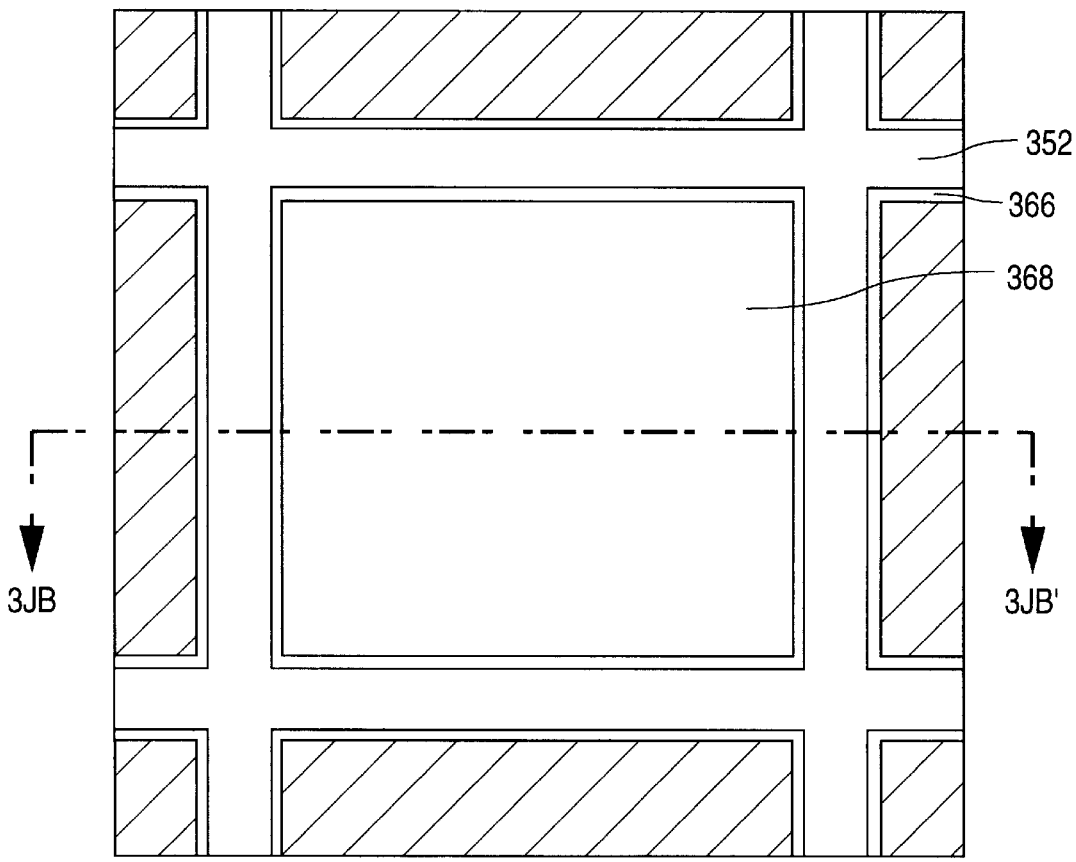
Figure 3J:
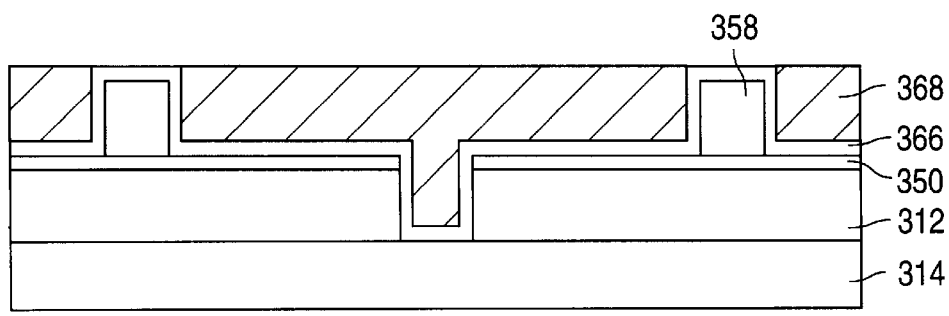

FIGS. 3JA–3JB show the results of chemical-mechanical polishing of metal pixel electrode layer 368, until the surface of the pixel array is flat. This polishing step utilizes the tops of spacer walls 358 as a polish stop. This ensures that the metal pixel electrode layer is removed only to the tops of the spacer walls, such that the resulting electrode/wall-top surface is substantially planar.

Formation of the pixel cell array may optionally be completed by the formation of passivation layers over the polished pixel electrodes. An example of such passivation is described more completely in U.S. patent application Ser. No. 08/872,013, entitled, "REFLECTANCE ENHANCING THIN FILM STACK," filed Jun. 7, 1997.

Formation of the liquid crystal silicon light valve is completed by adding liquid crystal material and sealing a translucent top plate onto the structure.

The thin LC transducer pixel cell in accordance with the present invention offers a number of important advantages over existing devices. One advantage is that the pixel cell exhibits a minimum surface topology as compared with the prior art. Specifically, because the metal pixel electrode layer is polished to be flush with the tops of the spacer walls, there is little or no interruption in the planarity of the surface of the device to interact with incident light, or to trigger misalignment of the overlying LC. The resulting planar electrode/wall-top surface thus offers excellent reflective properties.

A second important advantage offered by the present invention is that the surface of the metal pixel electrode layer is not exposed to steps that could roughen or oxidize its surface and reduce reflectance. Rather, the pixel electrode layer is deposited late in the process flow, with excess material removed by polishing which produces a smooth and highly reflective electrode surface.

Although the invention has been described in connection with one specific preferred embodiment, it must be understood that the invention as claimed should not be unduly limited to such specific embodiments. Various other modifications and alterations in the structure and method of operation of this invention will be apparent to those skilled in the art without departing from the scope of the present invention.

For example, while the process in accordance with the first embodiment of the present invention forms the spacer walls from $SiO_2$, alternative dielectric materials could also be utilized. This would likely require a corresponding change in the etching chemistries employed. In addition, the specific composition of the etch-stop layer used in forming the dielectric spacer walls could also be varied to conform to specific process requirements, and still remain within the scope of the present invention.

Moreover, there may be variation in the order of the specific process steps discussed above. FIGS. 3CA–3GB illustrate etching dielectric layer 352 to form spacer walls 358 prior to etching upper intermetal dielectric layer 312 to form vias 364. However, in a first alternative embodiment of the present invention, the spacer wall and via masking steps may be reversed in sequence such that vias are formed prior to the creation of the spacer walls. In a second alternative embodiment of the present invention, the upper intermetal dielectric layer may be formed, masked and etched to create the via, and the via filed with electrically conducting material, prior to formation of the overlying silicon nitride etch stop layer. In either case, the resulting process and pixel cell array would remain within the scope of the present invention.

Furthermore, in the above discussion of FIGS. 3IA–3IB via 364 is shown as being filled with the same metal used to create the metal pixel electrode layer (typically Al or an Al/Cu mixture). However, the present invention is not limited to this specific step, and the via underlying the pixel electrode could be filled instead with tungsten or some other electrically conducting material prior to formation of a metal pixel electrode layer.

Figure 4A:
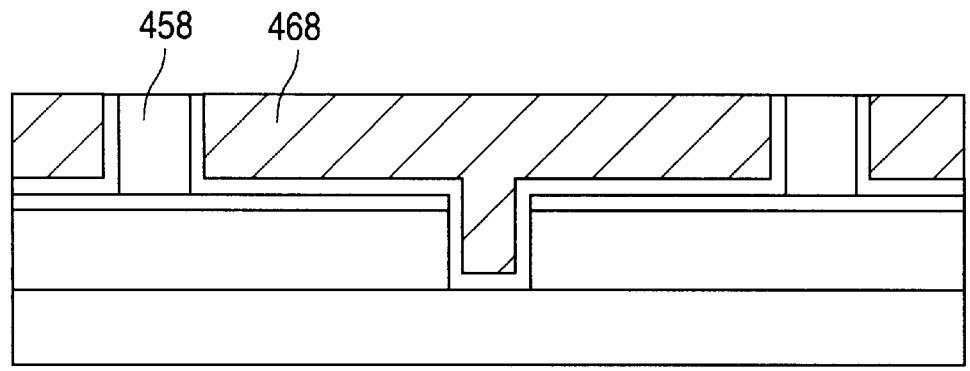
FIGS. 4A–4B shows a cross-sectional views of pixel cell in according with the present invention which has electrode with light focus in quality.
Figure 4B:
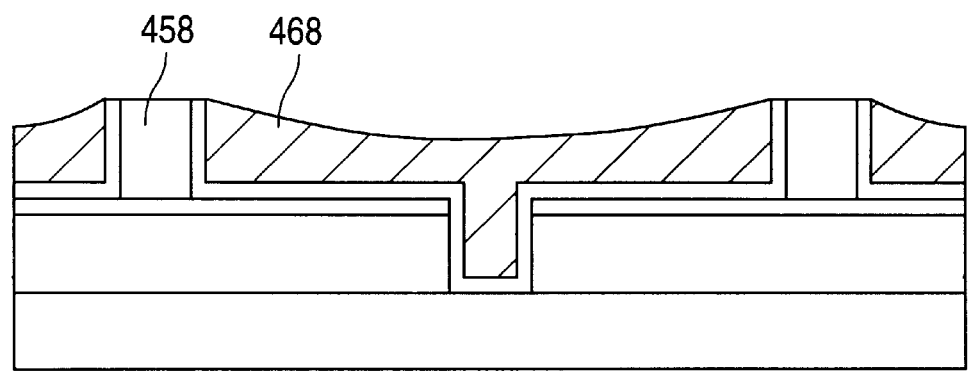

In addition, while the above discussion has been limited exclusively to creating a planar, highly reflective pixel electrode surface, it is also possible to utilize the principles of the present invention to create an electrode surface having light focusing qualities. FIGS. 4A–4B illustrate this principle.

FIG. 4A (identical to prior FIG. 3JB) shows the result of chemical-mechanical polishing of metal pixel electrode layer 468 to yield and electrode having a perfectly planar surface. However, FIG. 4A is likely an idealized representation of the final electrode/wall top surface.

Under actual polishing conditions, dielectric spacer walls 458 will inhibit perfect planarization. This is because the polishing pad will conform to the topography defined by the spacer walls, and will not contact portions of the metal pixel electrode layer immediately adjacent to the spacer walls.

Thus, as shown in FIG. 4B the pad will exert greater pressure upon center portion 468a of pixel electrode layer 468 than at edge portions 468b of pixel electrode layer 468. As a result of the difference in pressure exerted by the polish pad, pixel electrode layer 468 will actually assume a slightly concave shape. Within reasonable limits, the slightly concave shape of the pixel electrode will not distort or dim the image presented by the light valve, because incident light is being reflected toward the center of the pixel cell.

In this manner, chemical-mechanical polishing may actually be used to create pixel electrodes having a variety of profiles. By varying process parameters such as 1) the composition of the metal pixel electrode layer, 2) the thickness of the metal pixel electrode layer, 3) the composition of the spacer walls, 4) the height of the spacer walls, 5) the polishing pad used, and/or 6) the polishing slurry used, the metal pixel electrode can be shaped and exhibit a planar, concave, or even convex profile. These shaped electrodes would endow a pixel array with unique and potentially useful light focusing capabilities.

Therefore, it is intended that the following claims define the scope of the present invention, and that the methods and structures within the scope of these claims and their equivalents be covered hereby.

What is claimed is:

1. A process for forming an array of liquid crystal pixel cells comprising the steps of:

forming an array support structure from a dielectric material, the array support structure including a plurality of raised, intersecting spacer walls having a top surface;

forming a pixel electrode liner layer over the array support structure;

forming a metal pixel electrode layer on top of the pixel electrode liner layer; and chemical-mechanical polishing the metal pixel electrode layer to expose the top surface of the spacer walls, such that a plurality of metal pixel electrodes are formed.

2. The process according to claim 1 wherein the step of forming the array support structure comprises the steps of:

forming an intermetal dielectric layer over an interconnect metallization layer;

forming an etch stop layer on top of the intermetal dielectric layer;

forming a spacer wall dielectric layer over the etch stop layer;

patterning a spacer wall photoresist mask over the spacer wall dielectric layer, such that the spacer wall photoresist mask excludes precursor pixel cell regions; and etching the dielectric layer in precursor pixel cell regions to stop at the etch stop layer, such that the plurality of spacer walls are formed from the spacer wall dielectric layer.

3. The process according to claim 2 wherein the step of forming the intermetal dielectric layer and the step of forming the spacer wall dielectric layer comprise forming silicon dioxide, and wherein the step of forming the etch stop layer comprises forming silicon nitride.

4. The process according to claim 2 wherein the step of forming a metal pixel electrode layer comprises forming a metal pixel electrode layer of approximately the same thickness as the dielectric layer, whereby the step of chemical-mechanical polishing the metal pixel electrode layer creates planar metal pixel electrodes flush with the tops of the spacer walls.

5. The process according to claim 2 further comprising the steps of:

patterning a via photoresist mask over the intermetal dielectric layer prior to forming the etch stop layer such that the via photoresist mask excludes precursor via regions;

etching precursor via regions of the intermetal dielectric layer to stop on the interconnect metallization, such that a via is formed; and filling the via with an electrically conducting material.

6. The process according to claim 2 further comprising the steps of:

patterning a via photoresist mask over one of the spacer wall dielectric layer and the etch stop layer, such that the via photoresist mask excludes precursor via regions; and etching at least one of the spacer wall dielectric layer, the etch stop layer, and the intermetal dielectric layer in precursor via regions to stop on the interconnect metallization, such that a via is formed.

7. The process according to claim 6 wherein the steps of forming the spacer wall photoresist mask and etching the spacer wall dielectric layer to stop on the etch stop layer occur prior to the steps of forming the via photoresist mask and etching the etch stop layer and the intermetal dielectric layer to stop on the interconnect metallization layer.

8. The process according to claim 6 wherein the steps of forming the via photoresist mask and etching the spacer wall dielectric layer, the etch stop layer, and the intermetal dielectric layer to stop on the interconnect metallization layer occur prior to the steps of forming the spacer photoresist mask and etching the spacer wall dielectric layer to stop on the etch stop layer.

9. The process according to claim 6 wherein the step of forming metal within the via is performed during the step of forming the metal pixel electrode layer.

10. In a process for forming an array of liquid crystal pixel cells including the step of forming a metal pixel electrode layer over a pixel electrode liner layer, the improvement comprising the steps of:

forming an array support structure from a dielectric material, the array support structure including a plurality of raised, intersecting spacer walls having a top surface;

forming the pixel electrode liner layer over the array support structure;

forming the metal pixel electrode layer over the pixel electrode liner layer; and chemical-mechanical polishing the metal pixel electrode layer to expose the top surface of the spacer walls, such that a plurality of metal pixel electrodes are formed.

11. The improved process according to claim 10 wherein the step of forming the array support structure comprises the steps of:

forming an intermetal dielectric layer over an interconnect metallization layer;

forming an etch stop layer on top of the intermetal dielectric layer;

forming a spacer wall dielectric layer over the etch stop layer;

patterning a spacer wall photoresist mask over the spacer wall dielectric layer, such that the spacer wall photoresist mask excludes precursor pixel cell regions; and etching the spacer wall dielectric layer in precursor pixel cell regions to stop at the etch stop layer, such that the plurality of spacer walls are formed from the dielectric layer.

12. The improved process according to claim 11 wherein the step of forming the metal pixel electrode layer comprises forming a metal pixel electrode layer having approximately the same thickness as the spacer wall dielectric layer, whereby the step of chemical-mechanical polishing the metal pixel electrode layer creates planar metal pixel electrodes flush with the tops of the spacer walls.

13. The improved process according to claim 11 further comprising the steps of:

patterning a via photoresist mask over the intermetal dielectric layer prior to forming the etch stop layer such that the via photoresist mask excludes precursor via regions;

etching precursor via regions of the intermetal dielectric layer to stop on the interconnect metallization, such that a via is formed; and filling the via with an electrically conducting material.

14. The improved process according to claim 11 further comprising the steps of:

patterning a via photoresist mask over one of the spacer wall dielectric layer and the etch stop layer, such that the via photoresist mask excludes precursor via regions; and etching at least one of the spacer wall dielectric layer, the etch stop layer, and the intermetal dielectric layer in precursor via regions to stop on the interconnect metallization, such that a via is formed.

15. The improved process according to claim 14 wherein the step of forming the spacer wall photoresist mask and etching the spacer wall dielectric layer to stop on the etch stop layer occurs prior to forming the via photoresist mask and etching the etch stop layer and the intermetal dielectric layer to stop on the interconnect metallization layer.

16. The improved process according to claim 14 wherein the step of forming the via photoresist mask and etching the spacer wall dielectric layer, the etch stop layer, and the intermetal dielectric layer to stop on the interconnect metallization layer occurs prior to the step of forming the spacer photoresist mask and etching the dielectric layer to stop on the etch stop layer.

17. The improved process according to claim 14 wherein the step of forming metal within the via is performed during the step of forming the metal pixel electrode layer.

* * * * *